United States Patent
Bigo et al.

(10) Patent No.: US 6,675,576 B2
(45) Date of Patent: Jan. 13, 2004

(54) HYDRAULIC CIRCUIT HAVING A HYDRAULIC MOTOR EQUIPPED WITH A BRAKE FOR A VEHICLE SUITABLE FOR BEING TOWED

(75) Inventors: Louis Bigo, Compiegne (FR); Alain Mangano, Vieux-Moulin (FR); Jean-Philippe Raisin, Crepy en Valois (FR); Daniel Ruzicka, Nogent sur Oise (FR)

(73) Assignee: Poclain Hydraulics Industrie, Verberie (FR)

( * ) Notice: Subject to any disclaimer, the term of this patent is extended or adjusted under 35 U.S.C. 154(b) by 37 days.

(21) Appl. No.: 10/128,126

(22) Filed: Apr. 23, 2002

(65) Prior Publication Data

US 2002/0175032 A1 Nov. 28, 2002

(30) Foreign Application Priority Data

Apr. 23, 2001 (FR) .............................. 01 05424

(51) Int. Cl.[7] .............................................. F16D 31/02
(52) U.S. Cl. ........................................ 60/436; 60/494
(58) Field of Search ..................... 60/436, 494, 476, 60/487

(56) References Cited

U.S. PATENT DOCUMENTS

| | | |
|---|---|---|
| 4,317,331 A | 3/1982 | Aruga et al. |
| 4,495,767 A | 1/1985 | Akiyama et al. |
| 4,858,435 A * | 8/1989 | Ikeda .......................... 60/441 |

FOREIGN PATENT DOCUMENTS

JP           04102762 A   *  4/1992  ........... F16H/61/40

* cited by examiner

*Primary Examiner*—Edward K. Look
*Assistant Examiner*—Igor Kershteyn
(74) *Attorney, Agent, or Firm*—Ladas & Parry

(57) ABSTRACT

A hydraulic circuit for the hydrostatic transmission of a vehicle, said hydraulic circuit comprising at least one hydraulic motor, two main ducts, a parking brake having brake means, brake release control means suitable for feeding the brake release chamber from a first brake release fluid source, and means for connecting said chamber to a unpressurized reservoir. The circuit has a single short-circuit and selection valve having two main ports connected to respective ones of the two main ducts, and two selection ports connected respectively to the brake release chamber and to the brake release duct, and control means for controlling said valve, which control means are suitable for causing the valve to take up a first configuration in which the main ports are mutually isolated while the selection ports are interconnected, and for causing it to take up a second configuration in which the main ports are interconnected while the selection ports are mutually isolated.

18 Claims, 6 Drawing Sheets

HYDRAULIC CIRCUIT HAVING A HYDRAULIC MOTOR EQUIPPED WITH A BRAKE FOR A VEHICLE SUITABLE FOR BEING TOWED

The present invention relates to a hydraulic circuit for the hydrostatic transmission of a vehicle, said hydraulic circuit comprising at least one hydraulic motor, two main ducts, serving respectively as feed and as discharge main ducts for the motor, a parking brake comprising brake means suitable for being urged by return means into a braking position in which they brake the motor, and for being urged into an inactive position by feeding fluid to a brake release chamber via a brake release duct, the circuit further comprising brake release control means suitable for connecting said brake release duct to a first brake release fluid source, means for connecting the brake release chamber to a unpressurized reservoir, short-circuit valve means suitable for isolating said feed and discharge main ducts from each other or for interconnecting them, selection valve means suitable for connecting the brake release duct to the brake release chamber or for isolating said duct from said chamber, and auxiliary brake release means suitable for connecting the brake release chamber to a second brake release fluid source when said chamber is isolated from the brake release duct.

BACKGROUND OF THE INVENTION

When the motor is operational for driving the vehicle, brake release is achieved by feeding fluid to the brake release chamber, so that the brake means take up their inactive position. To achieve mechanical braking, it is necessary to cease feeding the brake release duct from the first brake release fluid source, and to connect the brake release chamber to the unpressurized reservoir, so as to enable said chamber to be emptied.

For example, a valve is disposed on the brake release duct and connects said duct either to the first brake release fluid source or to the unpressurized reservoir.

When the circuit is not fed with fluid, the motor is inactive, and the brake release chamber is not fed, so that the brake means are in their braking position under the effect of the return means which are, in particular, resilient return means such as a spring.

It is sometimes necessary to tow the vehicle. In order for towing to take place properly, two conditions must be satisfied. Firstly, it is necessary to prevent the hydraulic motor from delivering torque that opposes the towing, i.e. the motor must be deactivated by enabling its rotor to turn in freewheel mode. For this purpose, the short-circuit valve means are controlled so that they interconnect the feed and discharge main ducts, i.e. so as to form a short-circuit between said ducts.

The second condition is that the brake must be deactivated. The first brake release fluid source can be an auxiliary pump such as a booster pump or the main pump of the circuit, which pump is driven so as to deliver the fluid under pressure when the vehicle is operating, in general by means of an engine. For towing purposes, the first brake release fluid source is not used, in particular because said engine is not in operation. It is therefore the second brake release fluid source that is used to deactivate the brake for towing purposes. For example, said second source can be a handpump, a pump fed by a small independent motor, or else a pressurized fluid source available on the vehicle for a function other than driving it (e.g. for powering a tool), even when the transmission of the vehicle is not operational. To achieve brake release for towing purposes, the selection valve means isolate the brake release duct from the brake release chamber which must be connected to the second brake release fluid source.

U.S. Pat. No. 4,317,331 shows a hydraulic circuit of this type, in which the short-circuit valve means and the selection valve means are constituted by two distinct hydraulic entities, each having its own specific control means.

OBJECTS AND SUMMARY OF THE INVENTION

An object of the present invention is to provide a simplified hydraulic circuit, making it possible to provide the functions of the short-circuit valve and of the selection valve simply, reliably, and inexpensively.

This object is achieved by the fact that the circuit of the invention has a single short-circuit and selection valve having two main ports connected to respective ones of the two main ducts, and two selection ports connected respectively to the brake release chamber and to the brake release duct, and control means for controlling said valve, which control means are suitable for causing the valve to take up a first configuration in which the main ports are mutually isolated while the selection ports are interconnected, and for causing it to take up a second configuration in which the main ports are interconnected while the selection ports are mutually isolated.

The single short-circuit and selection valve of the invention makes it possible, in a single hydraulic element, to provide the function of the short-circuit valve means and the function of the selection valve means. As a result, the circuit is naturally more compact than in the prior art, and it is easier to put the valve in place in the circuit. In addition, it is much simpler to organize towing. In the first configuration, the hydraulic motor can operate since the main ducts are isolated from each other, and since, at the same time, the selection ports are interconnected so as to allow brake release to take place via the first brake release fluid source. Conversely, in the second configuration, towing is possible since the two main ducts are interconnected, i.e. the motor is short-circuited, and the selection ports are isolated so as to enable brake release to take place via the second brake release fluid source. For this purpose, it is necessary merely to connect said second source to the brake release chamber. To go from a situation in which the motor can operate to this situation in which towing is possible, only the hydraulic entity constituted by the short-circuit and selection valve needs to be controlled, whereas, in U.S. Pat. No. 4,317,331, two valves need to be controlled.

Advantageously, the auxiliary brake release means comprise an auxiliary brake release duct suitable for connecting the brake release chamber to the second brake release fluid source when the short-circuit and selection valve is in its second configuration.

In which case, the second configuration of the short-circuit and selection valve of the invention is used to enable brake release to take place by means of the second brake release source, via the auxiliary brake release duct. In other words, when the valve is in the second configuration, it is not necessary to actuate any hydraulic element other than the second brake release source (as appropriately connected to the auxiliary brake release duct) in order to achieve brake release.

In which case, advantageously, the short-circuit and selection valve further has an auxiliary brake release port suitable for being connected to the second brake release fluid source, and the auxiliary brake release duct is formed in said valve and is suitable, when said valve is in the second configuration, for causing the selection port that is connected to the brake release chamber to communicate with said auxiliary brake release port.

The auxiliary brake release port is then part of the short-circuit and selection valve of the invention, and it is thus to said port that the second brake release fluid source can be connected to achieve brake release for towing purposes, in which case the fluid is fed to the brake release chamber by means of the selection port which is connected thereto. It is also possible to consider having the auxiliary brake release port connected continuously to said selection port, but having said auxiliary brake release port closed off when towing is not necessary, e.g. by a stopper situated outside the valve.

Advantageously, the short-circuit and selection valve is suitable for taking up an intermediate configuration in which the main ports are interconnected, and in which the selection ports are interconnected and communicate with the auxiliary brake release duct.

This intermediate configuration is advantageous when the circuit is such that, when the motor is in the operating situation, brake release and mechanical braking are respectively obtained by causing the brake release duct to communicate respectively with the first brake release fluid source and with the unpressurized reservoir. In which case, when the motor is stopped, the brake release duct is normally put in communication with the unpressurized reservoir. It is thus in this situation that towing is made possible, by means of the single valve of the invention. Once towing is finished, the above-mentioned intermediate configuration makes it possible momentarily to put the auxiliary brake release duct in communication with the brake release duct, which is itself in communication with the unpressurized reservoir. As a result, the intermediate configuration makes it possible to empty the auxiliary brake release duct, and facilitates going from the brake release situation for towing purposes to a situation in which mechanical braking is possible again.

Advantageously, the control means for controlling the single short-circuit and selection valve are mechanical means.

The mechanical means may be of any known type for mechanically displacing an element between two positions, e.g. operating by a cam system, by a screw system, or by any other suitable means. Rather than having mechanical control means, it is however possible to use control systems operating by fluid pressure or any other known means for driving a moving member.

In a particularly advantageous configuration, the short-circuit and selection valve is disposed in a casing portion of the hydraulic motor that is provided with two main orifices connected to respective ones of the feed and discharge main ducts and to respective ones of the main ports of said valve, two auxiliary ducts, connected respectively to the brake release chamber and to the brake release duct and to respective ones of the selection ports of the valve, also being provided in said casing portion.

The casing portion of the hydraulic motor is machined to have a recess in which the valve of the invention can be disposed. It is also machined so that said recess is connected respectively to the main ducts, to the brake release chamber, and to the brake release duct. The valve constitutes a single hydraulic entity which is easy to put in place in its recess. The valve requires very little space, and the circuit is compact. In addition, the valve is easy to remove without it being necessary to disassemble a major portion of the motor.

Advantageously, the short-circuit and selection valve is provided with a return port connected to a unpressurized reservoir, and, when said valve is in the second configuration, the main ducts are connected to said return port.

In which case, during towing with the motor short-circuited by the valve being in the second configuration, so that motor operates in freewheel mode with its rotor being rotated and its pistons able to move, the cylinders whose pistons are moving outwards are prevented from being fed again. By being connected to the leakage return duct, the main ducts are substantially unpressurized.

In which case, advantageously, the return port is connected to a leakage return duct of the hydraulic motor, which duct is itself connected to the unpressurized reservoir.

BRIEF DESCRIPTION OF THE DRAWINGS

The invention will be well understood and its advantages will appear more clearly on reading the following detailed description of an embodiment shown by way of advantageous example. The description refers to the accompanying drawings, in which.

MORE DETAILED DESCRIPTION

Figure 1:
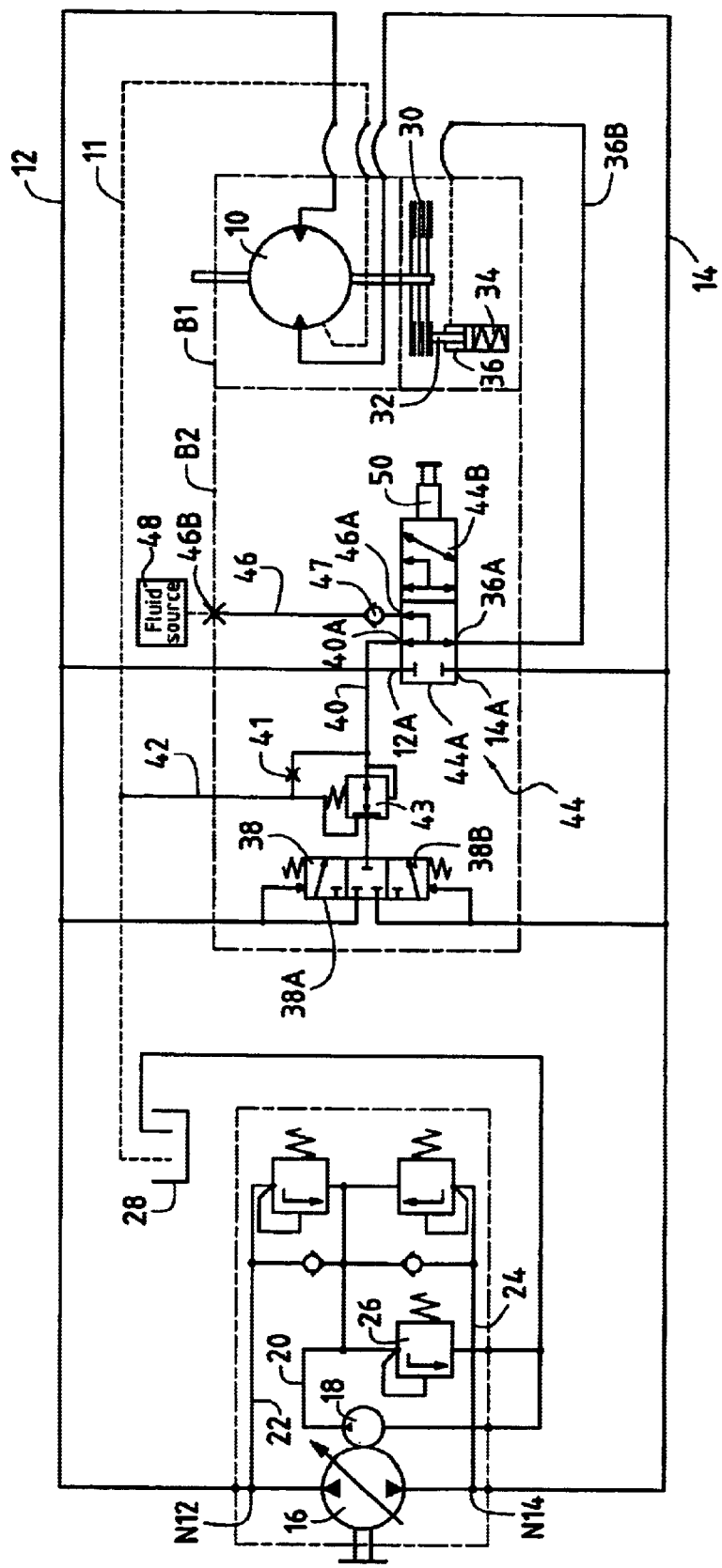
FIGS. 1 and 2 are two variants of a circuit of the invention.

The circuit of FIG. 1 includes a hydraulic motor 10 and two main ducts, respectively 12 and 14, connected to main orifices of the motor respectively for feed and for discharge purposes. In this example, the circuit is a closed circuit, and the two main ducts are connected to respective ones of the two orifices of an adjustable flow rate pump 16. The invention is also applicable to an open circuit (not shown). The circuit also includes a booster pump 18 serving to avoid cavitation in the ducts 12 and 14 to which its outlet is connected at nodes N12 and N14 via connection lines 22 and 24 on which check valves and pressure limiters are disposed in a manner known per se. The booster line 20 is connected to a unpressurized reservoir 28 via a pressure limiter 26 which serves to maintain sufficient pressure in said booster line.

The motor is provided with a parking brake which comprises braking means 30, e.g. made up, in known manner, by a stack of disks which are interleaved with one another and which are secured respectively to the rotor and to the stator of the motor, or by a positive clutch system.

The parking brake includes an urging member such as a piston 32 which can take up an active braking position in which it urges the brake means into the braking position, and an inactive position in which it makes it possible for the brake means to take up their inactive position. The piston is continuously urged towards its active position by return means such as a spring 34, while it can be positively urged into its inactive position by feeding fluid into a brake release chamber 36.

The circuit includes a brake release selector 38 which makes it possible to connect the brake release chamber 36 to a first brake release fluid source for deactivating the braking. In the example shown, the selector is a selector having three ports and three positions, the first two ports being connected to respective ones of the main ducts 12 and 14, and the third port being connected to a brake release duct 40.

The selector 38 is caused to move between its three positions under the effect of the pressure difference in the ducts 12 and 14. In its neutral position shown in FIG. 1, the selector does not connect the brake release duct 40 to a pressurized fluid source. Since said duct 40 is connected continuously to a fluid return duct 42, itself connected to the unpressurized reservoir 28, the brake release chamber is then merely connected to the reservoir, and the brake is activated.

Conversely, when the pressure in the main duct 12 is greater than the pressure in the main duct 14, the selector 38 takes up its first active position 38A in which the first and third ports of the selector, which ports are connected respectively to the ducts 12 and 40, are interconnected. The brake release duct can thus be fed with fluid via the pressure reducer 43. Similarly, when the selector 38 is in its second active position 38B, the brake release duct 40 can be fed with fluid via the duct 14. In both cases, the constriction 41 interposed between the ducts 40 and 42 makes it possible to obtain a brake release pressure that is sufficient in the chamber 36.

Thus, the first brake release fluid source is the fluid source constituted by the main pump 16 of the circuit or, at least, by the booster pump 18.

The circuit includes a single short-circuit and selection valve 44 which can have two configurations. The valve has two main ports 12A and 14A which are connected to respective ones of the main ducts 12 and 14. It also has two selection ports 40A and 36A which are connected respectively to the brake release duct 40 and to the brake release chamber 36 via a connection duct 36B.

In the first configuration 44A of the valve 44, as shown in FIG. 1, the ports 12A and 14A are isolated from each other, while the ports 40A and 36A are interconnected. As a result, the main ducts 12 and 14 are isolated from each other, so that the motor can operate normally, while the brake release duct is connected to the brake release chamber 36 so that brake release can be caused by the brake release selector 38 because, depending on whether the duct 40 is connected via said selector to a main duct 12 or 14, or is connected only to duct 42, the brake release chamber 36 can be fed with brake release fluid, or can be emptied.

In the second configuration 44B of the valve 44, its main ports 12A and 14A are interconnected, while its selection ports 40A and 36A are isolated from each other. This configuration is the configuration in which towing is possible. The ducts 12 and 14 being connected by means of the coupling between the ports 12A and 14A makes it possible to avoid a pressure difference between the feed and the discharge of the motor, so that the motor can operate in freewheel mode. The brake release chamber 36 is isolated from the brake release duct 40 and, in this situation, it can be fed with fluid via a second brake release fluid source, even if the pumps 16 and 18 do not deliver fluid under pressure.

Provision could be made for the chamber 36 to be connected continuously to an auxiliary orifice of the motor. While the vehicle is operating normally, said orifice would be closed off, e.g. by a stopper, or by any suitable means. Conversely, when towing is necessary, it would be necessary merely to open said orifice and to connect it to a second brake release fluid source, such as a handpump, or a pump driven by an auxiliary motor, in order to obtain brake release.

In this example, the situation is a little different, and the valve 44 has a fifth port 46A which is connected to an auxiliary brake release duct 46. At its end 46B, this duct may itself be connected to the second brake release fluid source 48. The end 46B may normally be closed off by a stopper, and be opened only for it to be connected momentarily to the source 48 in order to tow the vehicle whose transmission includes the motor 10. In its second configuration, the valve 44 interconnects the ports 36A and 46A, while isolating them from the port 40A which is connected to the brake release duct.

Advantageously, as can be seen in FIG. 1, the auxiliary brake release duct 46 includes a check valve 47 which allows the fluid to flow only in the direction going from the second brake release fluid source 48 to the brake release chamber 36. It is thus possible to avoid any leakage of fluid from the brake release chamber 36 to the outside via the duct 46, in particular if said end is opened to connect it to the second brake release fluid source.

Advantageously, the valve 44 has a return port that is connected to the unpressurized reservoir 28 and, when said valve is in the second configuration, the main ports 12A and 14A are connected to said return port. In this example, as indicated above, the port 40A is connected to the brake release duct 40 which, itself, is connected continuously to the reservoir 28 via the duct 42. Thus, the port 40A is both the selection port that is connected to the brake release duct, and also the above-mentioned return port. In the second position 44B, the ports 12A, 14A, and 40A are interconnected, as can be seen.

The motor 10 has a leakage return orifice which is connected to the reservoir 28 via a leakage return duct 11. In this example, it can be seen that the duct 42 is connected to the unpressurized reservoir 28 via said leakage return duct 11. Thus, it is via said leakage return duct 11 of the motor 10 that the return port of the valve 44 is connected to the unpressurized reservoir 28.

The valve 44 is caused to go between its two configurations by control means 50 of any suitable type.

The valve 44 is disposed in the same block as the motor. More precisely, the motor 10, and its brake constitute a sub-block B1, while the valves 38 and 44 form a sub-block B2, B1 and B2 forming a common hydraulic block. As described below with reference to FIG. 7, the short-circuit and selection valve may be integrated in the casing of the motor.

Figure 2:
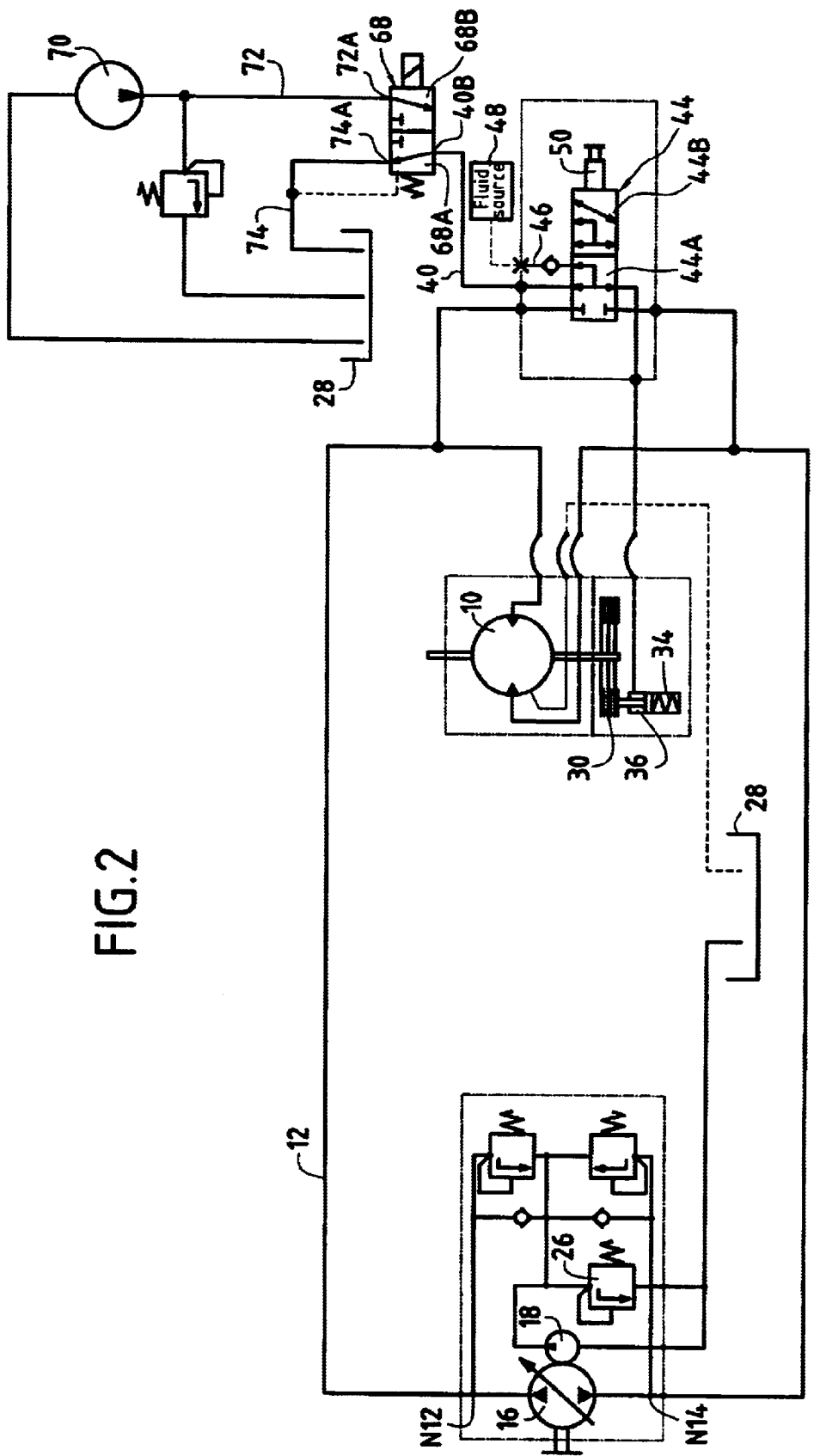

A description follows of the circuit of FIG. 2, in which the elements unchanged relative to FIG. 1 are given like references. The differences between the circuits of FIGS. 1 and 2 concern the control means for controlling brake release, and the brake release selector. In FIG. 2, the brake release duct 40 is connected directly to a two-position brake release selector 68 such as a solenoid valve. The first brake release fluid source is constituted by a pump 70 which can feed fluid to a brake release feed duct 72. The selector 68 has three ports, namely, a first port 40B connected to the brake release duct 40, a second port 72A connected to the duct 72, and a third port 74A connected to the unpressurized reservoir 28 via a return duct 74.

The selector 68 is shown in its first position 68A, in which its ports 40B and 74A are interconnected, so that the brake release duct is connected to the reservoir 28. In its second position 68B, the selector connects the brake release duct 40 to the pump 70 via the communication between its ports 40B and 72A. Thus, when the valve 44 is in its first configuration 44A, brake release is caused by the selector 68 only. In this case, when the selector is in the first position 68A, the brake release chamber 36 can be emptied via the communication between the duct 40 and the unpressurized reservoir 28, while, when the selector is in the second position 68B, the brake release chamber can be fed via the duct 40 which receives fluid from the pump 70. Conversely, when the valve 44 is in the second position 44B, brake release can be achieved only via a second source of brake release fluid, as indicated with reference to FIG. 1.

Figure 3:
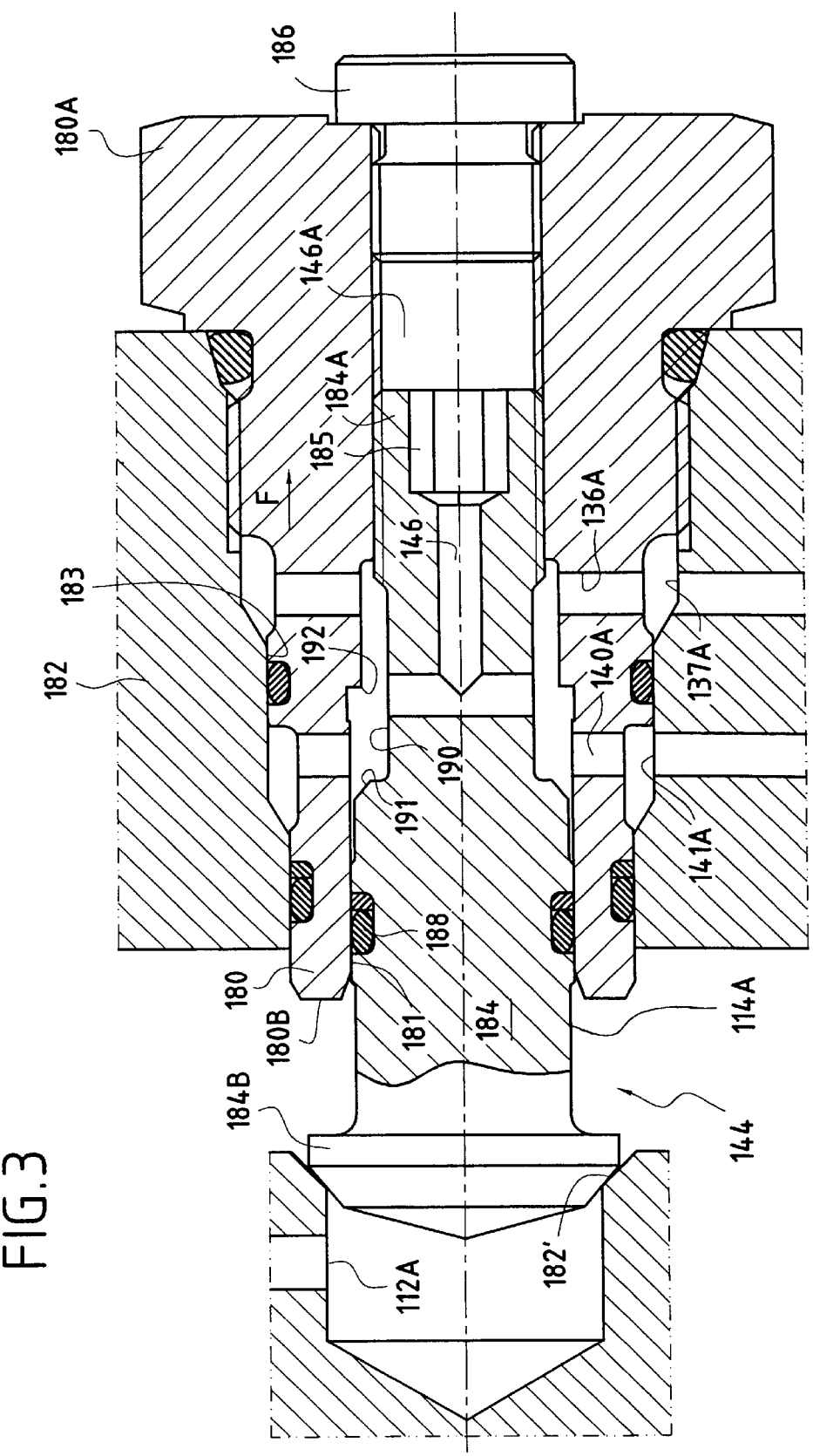
FIG. 3 is an axial section view of a short-circuit and selection valve of the invention.

A description follows of FIG. 3 which shows an example of a short-circuit and selection valve of the invention. This valve 144 comprises a valve body 180 which is fixed (e.g. by screw-fastening) in a bore 183 of an outer body 182 which, as explained below, may be a portion of casing for a hydraulic motor. A moving member 184 is mounted in the valve body 180 and can be driven from the end of the valve body 180 that opens out on the outside of the body 182. For example, the free end 180A of the valve body that carries a nut making it possible to screw the valve body into the outer body 182 is provided with a through hole, and a stopper 186 is disposed in the hole. The end 184A of the moving member that faces towards the stopper 186 is shaped to be capable of being turned by suitable means. For example, it is provided with a hole or a recess 185 having engageable facets suitable for being engaged by a tool such as a hexagonal key.

The moving member 184 is disposed in the bore 181 in the valve body, and it co-operates therewith by screwing, its end portion 184A being threaded and co-operating with a tapping formed in a segment of the bore 181. To move the moving member 184 between its two positions, it is necessary merely to remove the stopper 186 and, by means of a tool such as a hexagonal key, to turn the moving member 184 SO that it moves in translation in the bore 181 by screwing.

At its end opposite from its end 184A, the moving member 184 has a head 184B which, when the moving member is in the first position, co-operates with a seat 182' provided in the outer body 182. The head 184B extends beyond that end 180B of the valve body 180 which is opposite from its other end 180A.

The two main ports 112A and 114A of the valve 144 are separated from each other by the seat 182'. They are formed by ducts provided in the outer body 182, and they communicate with the main ducts of the motor. Thus, depending on the position of the moving member 184, the two main ports can be interconnected or isolated from each other by means of the head 184B co-operating with its seat 182'.

The two selection ports 136A and 140A are formed by two other ducts provided in the valve body 180, the outer body 182 being provided with communication holes 137A and 141A disposed in register with respective ones of the ducts 136A and 140A and causing these ducts to communicate continuously with the bore 181, these communication holes themselves being connected respectively to the brake release chamber and to the brake release duct.

Thus, the two main ports and the two selection ports open out in the bore 181. It can be seen that the valve 144 is provided with means for providing sealing between a first set made up of the two main ports 112A and 114A and a second set made up of the two selection ports 140A and 136A. In the example shown, these means are constituted by one or more gaskets 188 disposed in a groove formed at the outer periphery of the moving member 184 and co-operating with the wall of the bore 181 in a smooth portion thereof. It may be desired to omit such gaskets by providing sealing merely by the moving member 184 being fitted snugly in the bore 181 so that, in the portion of the bore that separates the two above-mentioned sets, the co-operation between the moving member and the bore takes place substantially without any clearance. Depending on the clearance and on manufacturing tolerances, it is thus possible to obtain leaktightness that is almost complete or else merely relative.

Thus, the two main ports and the two selection ports open out in two distinct zones of the bore 181, and they are separated by sealing means (gaskets 188, or reduced clearance) which co-operate with the periphery of the moving member 184.

Between the sealing means 188 and its end 184A, the moving member 184 has interconnection means for interconnecting the selection ports 136A and 140A. For example, these interconnection means may be constituted by a portion of reduced cross-section forming a groove 190. When the moving member 184 is in the first position, as shown in FIG. 3, this groove is in register both with the holes 136A and with the holes 140A. In its second position, the moving member is displaced in the direction F, so that a sealing portion 191 of the outer periphery of the slide that is situated between the groove 190 and the gaskets 188 comes to co-operate with a sealing portion 192 formed on the wall of the bore 181, between the ducts 140A and 136A. Thus, when the moving member 184 is in the second position, the selection ports 136A and 140A are isolated from each other. Conversely, since the head 184B has moved closer to the body 180, the main ports 112A and 114A communicate with each other.

However, in this second position, the moving member 184 isolates the main ports 112A and 114A from the selection port 140A by means of the gaskets 188.

In addition, the moving member 184 is provided with a hole 146 which opens at one end at the end 184A, and at the other end in the groove 190. This hole constitutes an auxiliary brake release duct and that portion of the bore 181 in which the end 184A of the moving member 184 is situated constitutes an auxiliary brake release port 146A. As can be seen in FIG. 3, when the valve 144 is in the first configuration, this port 146A communicates with the two selection ports 136A and 140A via the duct 146. Conversely, when the moving member is in its second position, the port 146A communicates only with the selection port 136A which is the selection port that is connected to the brake release chamber.

Figure 4A:
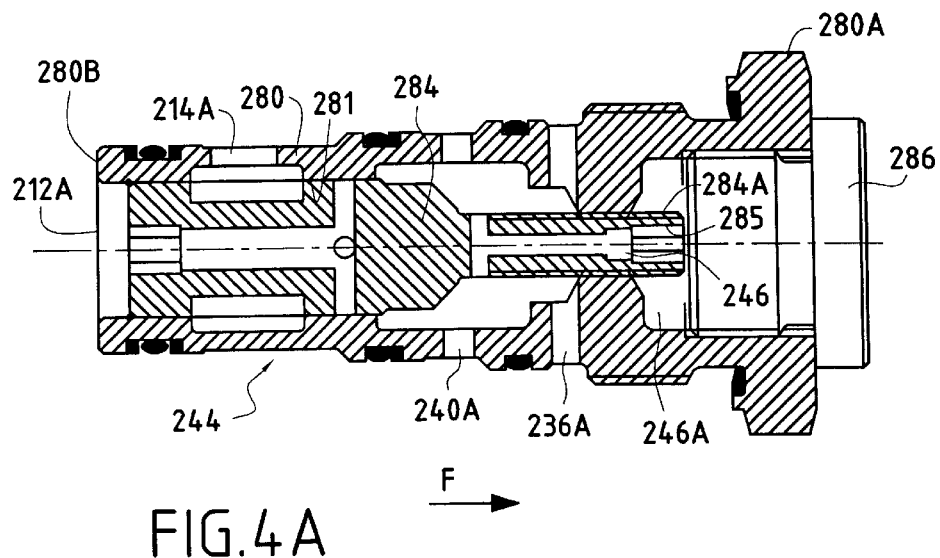
FIGS. 4A and 4B show a first variant of a short-circuit and selection valve, respectively in its first configuration and in its second configuration.
Figure 4B:
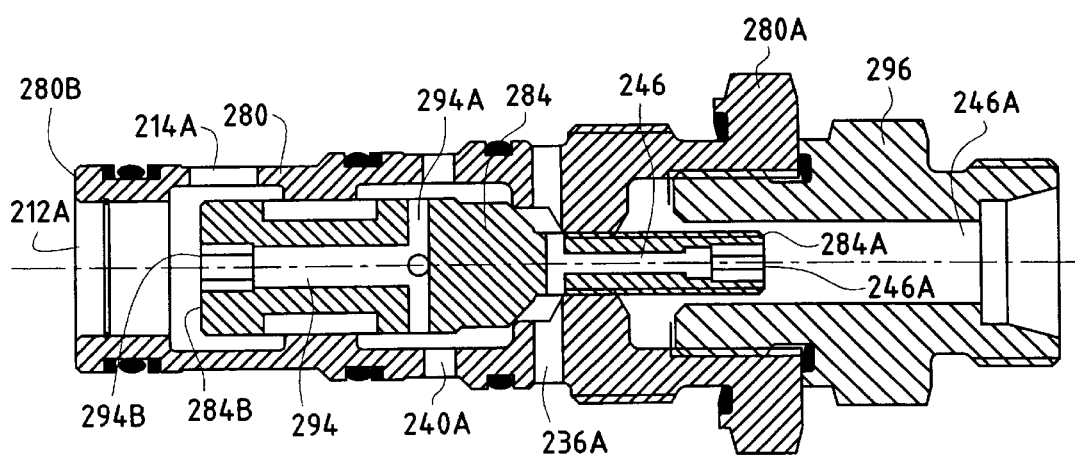

A description follows of FIGS. 4A and 4B in which the same references as in FIG. 3 plus 100 are used to designate the corresponding elements. The body 280 of the valve 144 is longer than the body 180 in FIG. 3, and the first main port 212A is formed at the end 280B of the body, while the second main port 214A and the selection ports 236A and 240A are formed between the end 280B and the opposite end 280A in three successive axial zones. In its first position, as shown in FIG. 4A, the moving member 284 mutually isolates the ports 212A and 214A, while it interconnects the ports 240A and 236A.

Like the member 184, the moving member 284 is caused to go between its two positions by screwing. In FIG. 4B, it is in its second position because it has been moved in the direction F relative to FIG. 4A. In which case, the port 236A is isolated from the port 240A and communicates with the auxiliary brake release port 246A via the auxiliary brake release duct 246. The auxiliary brake release duct is constituted by a first hole in the moving member 284 that is situated at its end 284A. This moving member is provided with a second hole 294 that is situated at its end 284B opposite from its end 284A. Said second hole 294 opens out at 294A onto the axial periphery of the moving member 284, in a middle region thereof, and it also opens out at 294B at the end 284B of said moving member. When the moving member is in the first position, as shown in FIG. 4A, the opening 294A is closed off by co-operation between the moving member and the wall of the bore 281. Conversely, when the moving member 284 is in the second position, the opening 294A is situated facing the selection port 240A, so that it makes it possible for the main ports 212A and 214A to communicate with the selection port 240A. This situation is thus as in the second configuration 44B of the valve 44 of FIG. 1, and, as indicated above, makes it possible to cause the main ducts of the motor to communicate with a unpressurized reservoir.

In addition, in FIG. 4B, the stopper 286 has been removed and a connection part 296 has been screwed into the bore 281, in the vicinity of the end 280A of the valve body 280, so as to make it possible for the duct 246 to be fed with fluid from a second brake release fluid source (not shown).

Figure 5:
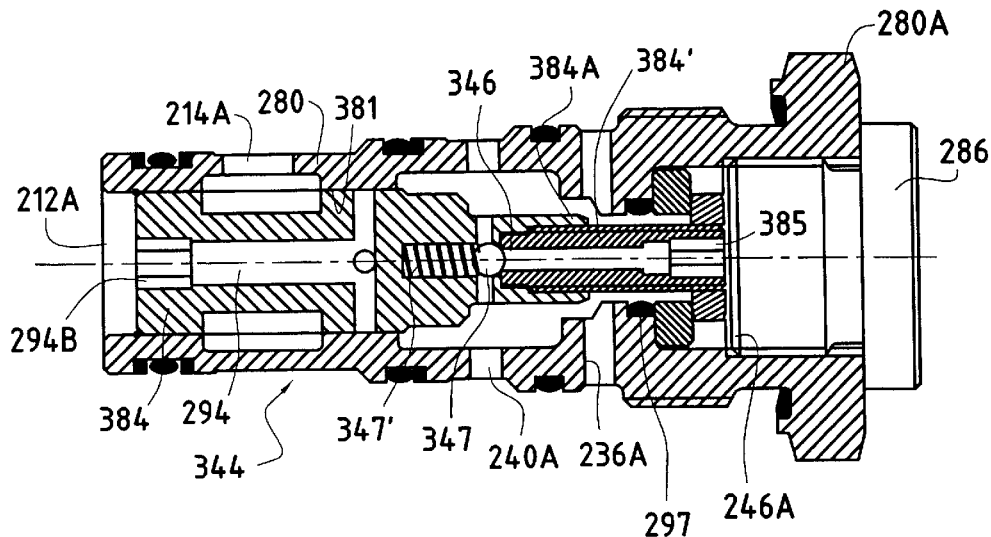
FIGS. 5 and 6 are views analogous to FIG. 4, respectively for a second variant and for a third variant.

FIG. 5 shows a variant of the valve of FIGS. 4A and 4B, and the references used to designate the unchanged elements also remain unchanged. The moving member 384 of the valve 344 is slightly different from the moving member 284 because it is provided with a check valve in its auxiliary brake release duct 346. At that end 384A of the moving member in which the auxiliary brake release duct 346 is provided, a ball or the like 347 that is continuously urged towards the end 384A by a spring 347' is held in place by an auxiliary part 384' which is screwed to the end 384A of the moving member, in the hole therein.

The valve 344 operates identically to the valve 244 except that the check valve 347, 347' prevents fluid from flowing in the direction going from the selection port 236A to the auxiliary brake release port 246A. In addition, sealing is provided by a gasket 297 between the outer periphery of the moving member 384 in the vicinity of its end 384A and the wall of the bore 381 in which the moving member is disposed.

To bring the moving member 384 as equipped with the auxiliary part 384' to its second position, it is necessary, after removing the stopper 286, merely to use a screwing tool of the key type, to cause it to co-operate with the matching surface 385 formed at the free end of the part 384', and thus to turn the parts 384 and 384' in the appropriate direction. By turning them in the other direction, it is possible to bring them back to their first position. In order to avoid turning in one of the directions from tending to release the parts 384 and 384' from each other, they may have additional fixing, such as adhesive.

When putting the part 384' in place at the end 384A of the part 384 by screwing by means of a first tool, the part 384 is held by means of a second tool to prevent it from turning by means of the appropriate shaping (with facets) of the free end 294B of the hole 294.

Figure 6:
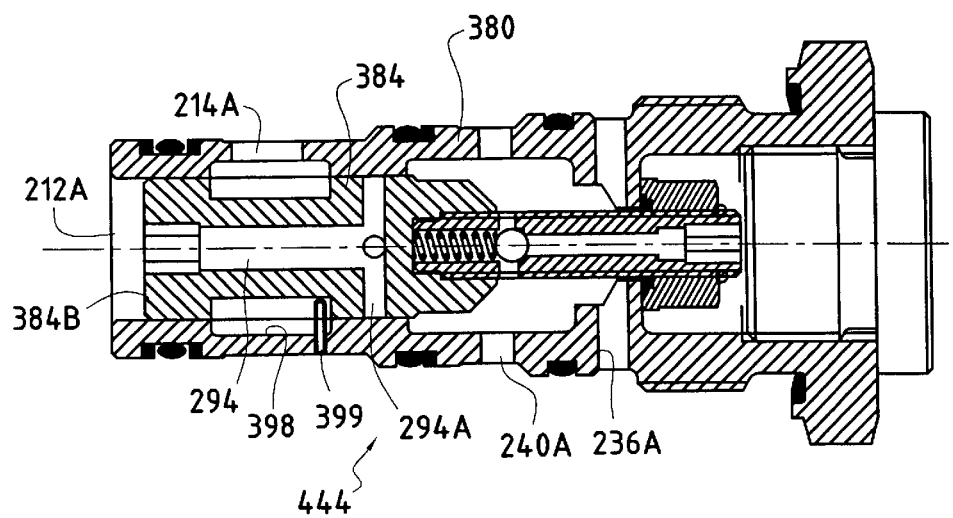

FIG. 6 shows a variant that makes it possible to avoid having to use two tools for putting the part 384' in place. One or more longitudinal grooves 398 are provided in the axial periphery of the moving member 384, e.g. between the free end 384B thereof and the openings 294A of the link hole 294. Keying means such as a pin 399 are disposed in the body 380 of the valve 444 so as to engage in a groove 398 to prevent turning. Thus, the part 384' can be put in place at the end of the part 384 after said part 384 has been inserted into the valve body 380.

Figure 7:
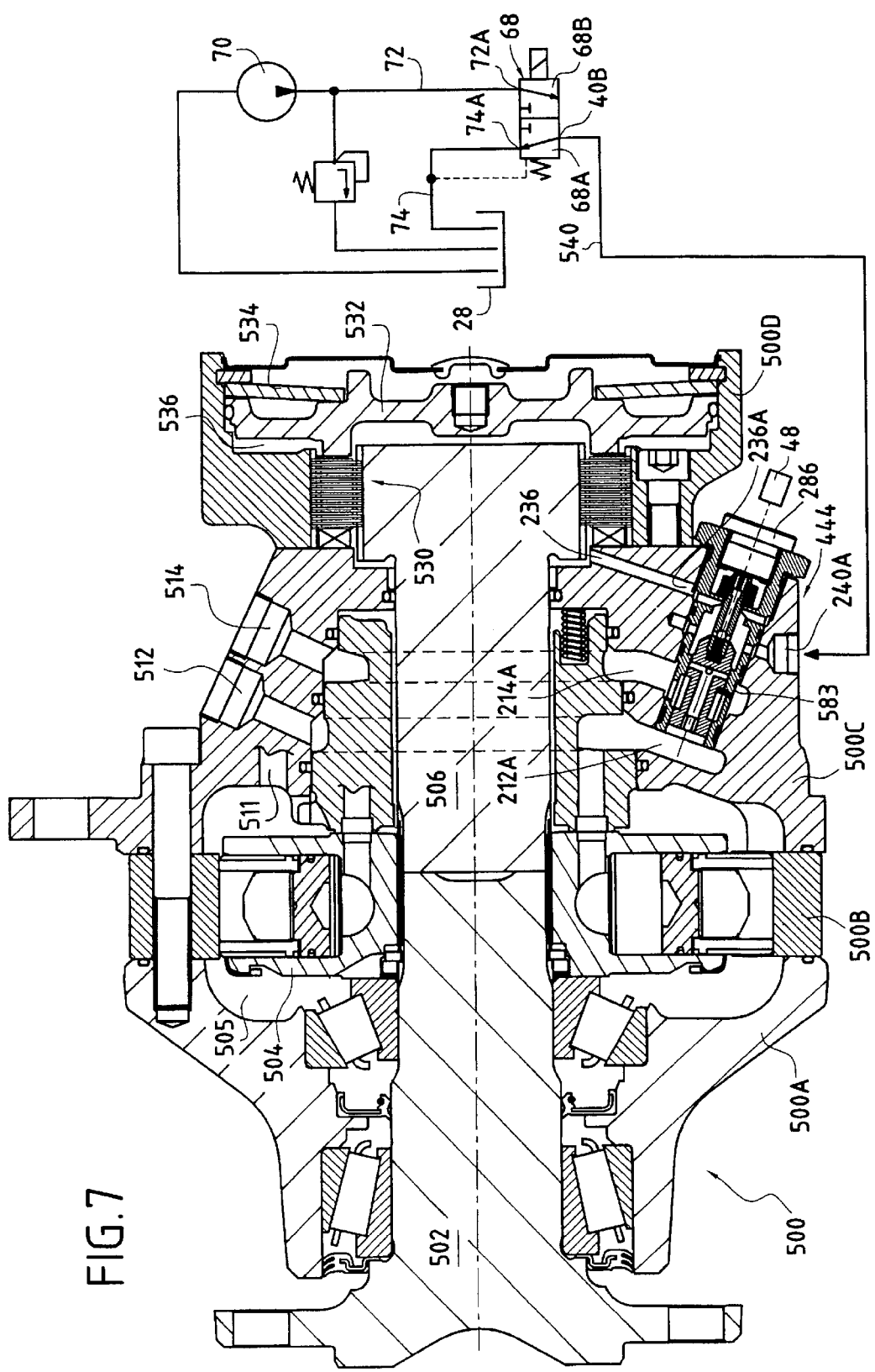
FIG. 7 is an axial section view of a hydraulic motor equipped with a valve of the invention.

FIG. 7 shows a hydraulic motor equipped with a short-circuit and selection valve of the invention. In this example, the motor is a motor having radial pistons and a rotary shaft, but it may also be a motor having a rotary casing. For example, it may be a motor of the type described in Patent Applications FR-A-2 588 615 and FR-A-2 780 450. The casing of the motor 500 is in three portions 500A, 500B, and 500C which are assembled together. The cam of the motor is formed at the inner periphery of the portion 500B. The motor 500 includes a shaft 502 which is constrained to rotate because it is secured to the cylinder block 504, e.g. by fluting.

The motor is also provided with a parking brake. In this example, it has a brake shaft 506 which is also constrained to rotate with the cylinder block and which, at its end further from the cylinder block, carries brake means, e.g. constituted by a first series of disks 530. A fixed casing portion 500D referred to as the "brake casing", carries the remainder of the brake means, e.g. constituted by another series of disks interleaved between the disks of the first series. The disks are urged into braking contact by a brake piston 532, itself continuously urged in the braking contact direction by a return spring 534. The brake system includes a brake release chamber 536 which can be fed with fluid via a brake release duct 550, which duct can itself be connected to a first brake release fluid source, or to a unpressurized reservoir.

The motor is provided with two main orifices connected to respective ones of two main ducts 512 and 514. These orifices open out in the portion 500C of the casing. In the example shown, the valve that equips the motor is the valve 444 of FIG. 6, which valve is mounted in a bore 583 in the portion 500C of the casing. By appropriate machining of this portion 500C, the orifices 512 and 514 communicate with respective ones of the two main ports 212A and 214A of said valve. The first selection port of the valve 236A communicates with the brake release chamber 536 via a duct 236 formed in the portion 500C of the casing. The second selection port 240A communicates with the brake release duct 540. The brake release duct is connected to a brake release selector 68 identical to the brake release selector of FIG. 2, and, depending on the position of the selector, it may be fed by the auxiliary pump 70 or be connected to the reservoir 28, e.g. via the internal space 505 of the casing of the motor, and via its leakage return 511 if the valve 68 is integrated in the casing.

Thus, the short-circuit and selection valve of the invention is fixed removably in a bore in the casing of the hydraulic motor, via its valve body in which its slide is disposed.

This portion 500C of the casing or some other portion of the casing, e.g. the brake cover 500D, is advantageously provided with an auxiliary brake release orifice connected to the auxiliary brake release port of the short-circuit and selection valve. However, as can be seen in FIG. 7, the auxiliary brake release orifice may be formed at that end of the valve which opens out to the outside of the motor, and which is closed off by the stopper 286.

What is claimed is:

1. A hydraulic circuit for the hydrostatic transmission of a vehicle, said hydraulic circuit comprising at least one hydraulic motor, two main ducts, serving respectively as feed and as discharge main ducts for the motor, a parking brake comprising brake means suitable for being urged by return means into a braking position in which said brake means brake the motor, and for being urged into an inactive position by feeding fluid to a brake release chamber via a brake release duct, the circuit further comprising brake release control means suitable for connecting said brake release duct to a first brake release fluid source, means for connecting the brake release chamber to an unpressurized reservoir, short-circuit valve means suitable for isolating said feed and discharge main ducts from each other or for interconnecting them, selection valve means suitable for connecting the brake release duct to the brake release chamber or for isolating said duct from said chamber, and auxiliary brake release means suitable for connecting the brake release chamber to a second brake release fluid source when said chamber is isolated from the brake release duct; said short circuit valve means and said selection valve means being comprised in a single short-circuit and selection valve having two main ports connected to respective ones of the two main ducts, and two selection ports connected respectively to the brake release chamber and to the brake release duct, the hydraulic circuit having control means for controlling said valve, which control means are suitable for causing the valve to take up a first configuration in which the main ports are mutually isolated while the selection ports are interconnected, and for causing the valve to take up a second configuration in which the main ports are interconnected while the selection ports are mutually isolated.

2. A circuit according to claim 1, wherein the short-circuit and selection valve comprises a valve body and a moving member mounted to move in a bore in the body between a first position and a second position, which positions determine respectively said first and said second configurations.

3. A circuit according to claim 2, wherein the two main ports and the two selection ports open out in the bore, and wherein the short-circuit and selection valve has means for providing sealing between a first set made up of the two main ports and a second set made up of the two selection ports.

4. A circuit according to claim 3, wherein the two main ports and the two selection ports open out in two distinct zones of the bore separated by sealing means co-operating with the periphery of the moving member.

5. A circuit as claimed in claim 2, wherein the short-circuit and selection valve has an auxiliary brake release port suitable for being connected to the second brake release fluid source and wherein the auxiliary brake release means comprise an auxiliary brake release duct formed in said valve and suitable, when said valve is in the second configuration, for causing the selection port that is connected to the brake release chamber to communicate with said auxiliary brake release port.

6. A circuit according to claim 5, wherein the auxiliary brake release duct is connected continuously to the auxiliary brake release port.

7. A circuit according to claim 6, wherein the auxiliary brake release duct is formed in the moving member and opens out at an axial end thereof that is situated in the vicinity of one end of the bore, and wherein the auxiliary brake release port communicates with said end of the bore.

8. A circuit according to claim 1, wherein the auxiliary brake release means comprise an auxiliary brake release duct suitable for connecting the brake release chamber to the second brake release fluid source when the short-circuit and selection valve is in its second configuration.

9. A circuit according to claim 8, wherein the short-circuit and selection valve further has an auxiliary brake release port suitable for being connected to the second brake release fluid source, and wherein the auxiliary brake release duct is formed in said valve and is suitable, when said valve is in the second configuration, for causing the selection port that is connected to the brake release chamber to communicate with said auxiliary brake release port.

10. A circuit according to claim 9, wherein the short-circuit and selection valve is suitable for taking up an intermediate configuration in which the main ports are interconnected, and in which the selection ports are interconnected and communicate with the auxiliary brake release duct.

11. A circuit according to claim 9, wherein the short-circuit and selection valve is disposed in a casing portion of the hydraulic motor that is provided with two main orifices connected to respective ones of the feed and discharge main ducts and to respective ones of the main ports of said valve, two auxiliary ducts, connected respectively to the brake release chamber and to the brake release duct and to respective ones of the selection ports of the valve, also being provided in said casing portion, and wherein said casing portion has an auxiliary brake release orifice connected to the auxiliary brake release port of the short-circuit and selection valve.

12. A circuit according to claim 9, wherein the auxiliary brake release duct has a check valve allowing the fluid to flow only in the direction going from the second brake release fluid source to the brake release chamber.

13. A circuit according to claim 8, wherein the auxiliary brake release duct has a check valve allowing the fluid to flow only in the direction going from the second brake release fluid source to the brake release chamber.

14. A circuit according to claim 1, wherein the control means for controlling the single short-circuit and selection valve are mechanical means.

15. A circuit according to claim 1, wherein the short-circuit and selection valve is disposed in a casing portion of the hydraulic motor that is provided with two main orifices connected to respective ones of the feed and discharge main ducts and to respective ones of the main ports of said valve, two auxiliary ducts, connected respectively to the brake release chamber and to the brake release duct and to respective ones of the selection ports of the valve, also being provided in said casing portion.

16. A circuit according to claim 15, wherein the short-circuit and selection valve comprises a valve body in which the moving member of said valve is disposed, and which is fixed removably in a bore in said casing portion of the hydraulic motor.

17. A circuit according to claim 1, wherein the short-circuit and selection valve is provided with a return port connected to a unpressurized reservoir, and wherein, when said valve is in the second configuration, the main ducts are connected to said return port.

18. A circuit according to claim 17, wherein the return port is connected to a leakage return duct of the hydraulic motor, which duct is itself connected to the unpressurized reservoir.

* * * * *